Figure 1:
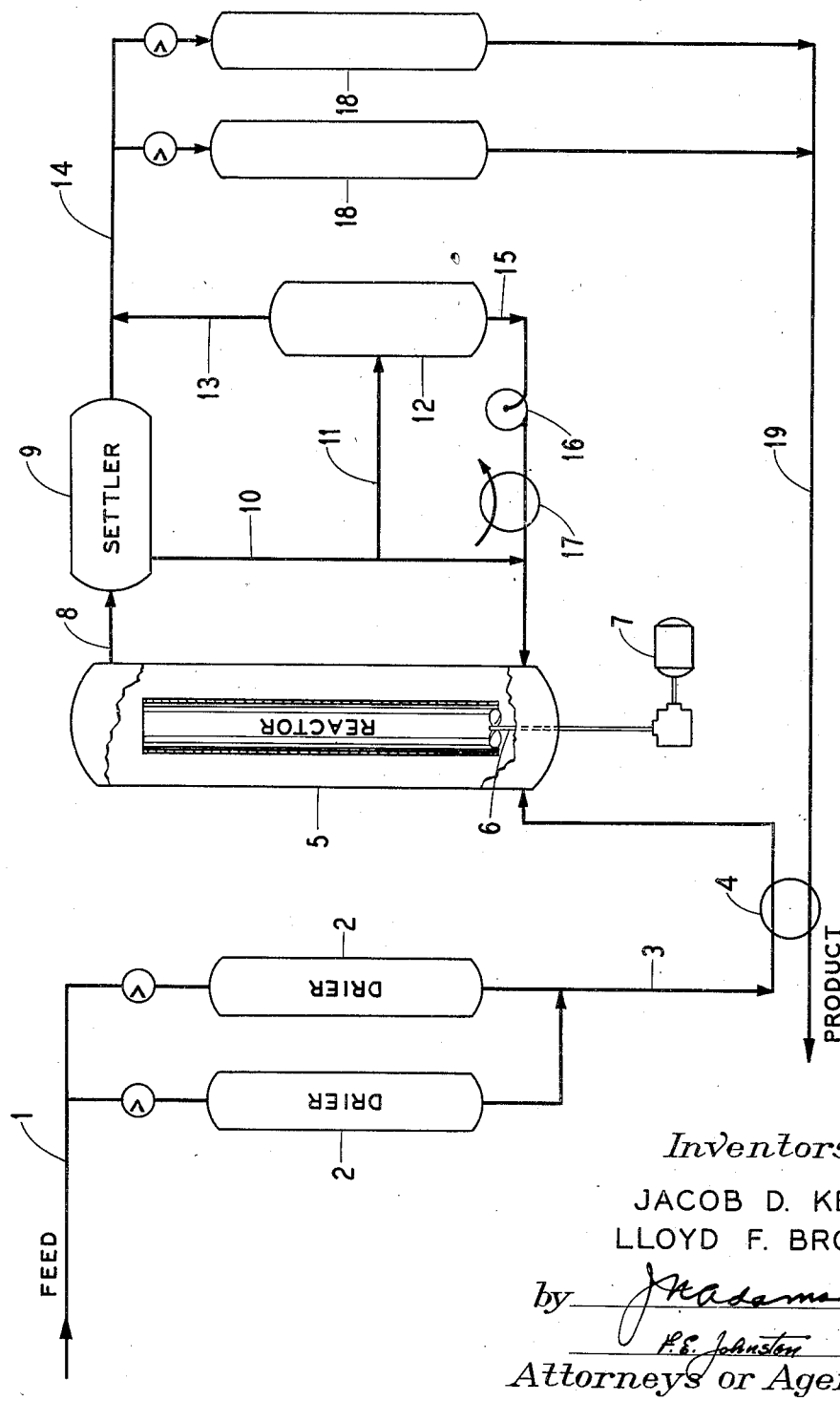

Inventors
JACOB D. KEMP
LLOYD F. BROOKE

Patented Apr. 3, 1951

2,547,013

UNITED STATES PATENT OFFICE 2,547,013

REDUCTION OF PHOSPHORIC ACID CORROSION IN A POLYMERIZATION PROCESS

Jacob D. Kemp, Richmond, and Lloyd F. Brooke, Berkeley Highland Terrace, Calif., assignors to California Research Corporation, San Francisco, Calif., a corporation of Delaware Application June 4, 1949, Serial No. 97,281

11 Claims. (Cl. 260—683.15)

The present invention relates to a process for the polymerization of olefins catalyzed by concentrated liquid phosphoric acid and more particularly to a method of inhibiting corrosion of the metal surfaces of a polymerization reactor and of auxiliary equipment and connecting lines contacted during the process by the reaction mixture and the catalyst.

It is well known that liquid phosphoric acid is an efficient polymerization catalyst. The use of this catalyst in the production, from normally gaseous olefins, of polymers boiling in the gasoline range was suggested more than twenty-five years ago. Since that suggestion was made, several commercial processes for the catalytic polymerization of olefins have been developed and are now in use in which the active catalytic material is phosphoric acid. No commercial process has been developed, however, in which bulk liquid phosphoric acid is employed as the catalyst.

Failure, in the past, to develop a commercial polymerization process employing bulk liquid phosphoric acid as the catalyst may be attributed principally to corrosion difficulties encountered in attempting to utilize this catalyst. Corrosion was apparently concluded to be so severe that it would limit the life of process equipment to a very short period. It was accepted that the acid-resistant metals from which process equipment might be constructed or with which it might be lined would be unable to withstand the corrosive attack of concentrated phosphoric acid sufficiently to make the process either safe or economic.

This consideration apparently directed commercial interest away from bulk liquid phosphoric acid and led to the development of the "solid" phosphoric acid catalyst prepared by mixing phosphoric acid with kieselguhr, extruding the mixture and calcining the extrudate, the "film" catalyst consisting of a thin film of liquid phosphoric acid disposed on quartz particles, and the metal pyrophosphate catalysts. In each of these, phosphoric acid is the effective catalytic material but it is used in a form which prevents the intimate and moving contact of the acid with apparatus surfaces which attends the employment of the bulk liquid acid as the catalyst.

The employment of bulk liquid phosphoric acid as a polymerization catalyst instead of the catalysts in current commercial use offers several substantial process advantages, in particular olefin feed rates approaching one hundred times those of the present commercial processes may be employed and equivalent conversions obtained.

It is the object of the present invention to provide a method of conducting an olefin polymerization process employing bulk liquid phosphoric acid as the catalyst which substantially reduces corrosion of acid-resistant metallic surfaces of the process equipment during operation.

It has been found that the phosphoric acid esters of feed olefins and of the olefinic reaction products formed simultaneously with the polymer product during a polymerization process catalyzed by liquid phosphoric acid have a marked effect on the rate at which acid-resistant metals suitable for reactor construction corrode. This effect has been found to exist in polymerizations of ethylene, propylene, and butylenes catalyzed by liquid phosphoric acid having an initial concentration above about 90% calculated as orthophosphoric acid at temperatures in the range 150–450° F., pressures above 100 p. s. i. g., and space velocities above 0.5 volumes of liquid olefin per volume of catalyst per hour. During the reaction these phosphoric acid esters are formed and their concentration in the reaction mixture increases steadily during the initial stages of operation after which an equilibrium is established in which the ester concentration remains approximately constant over a long period of operation if temperature and feed rate are kept substantially constant. The rates at which the metallic surfaces of the reactor and auxiliary equipment corrode may be substantially decreased by maintaining a low mol ratio of phosphoric acid esters to free phosphoric acid in the reaction mixture of hydrocarbons and phosphoric acid, especially a ratio below about 0.08 mol of ester per mol of free phosphoric acid.

The invention can be more clearly understood by reference to the appended drawings of which Figure 1 is a diagrammatic illustration of an arrangement of apparatus and process flow suitable for the practice of the invention.

Figure 2:
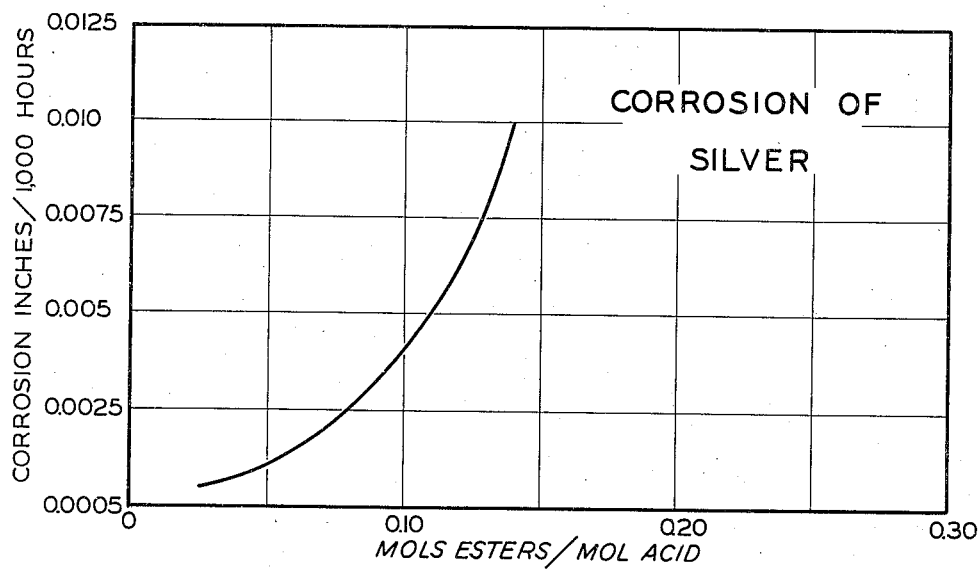
Figure 3:
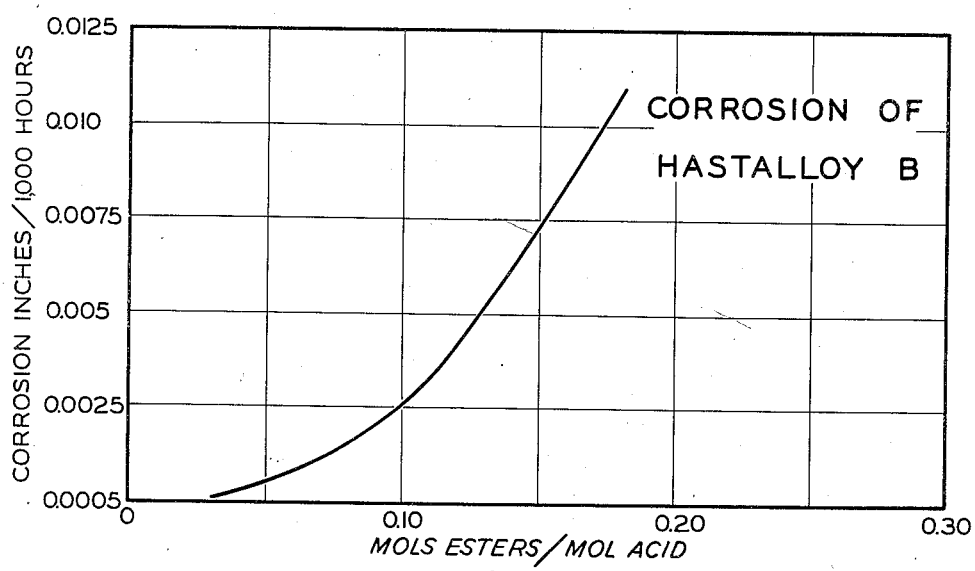

Figures 2 and 3 are graphical representations of the variation of corrosion rates with ester concentration for two typical acid-resistant metallic materials.

Referring now to Figure 1, a feed comprising normally gaseous olefins is introduced into line 1 and passes through one of the driers 2 charged with silica or alumina and connected in parallel to permit alternate use and regeneration. From the drier the feed passes through line 3 and through heat exchanger 4 into reactor 5 where it is contacted with concentrated liquid phosphoric acid which acts as the polymerization catalyst. The feed and catalyst are mixed in reactor 5 by impeller 6 which is driven by motor 7.

A mixture of acid and hydrocarbons is withdrawn through line 8 to settler 9 where the mixture settles forming a lower acid phase and an upper hydrocarbon phase. Acid is withdrawn from settler 9 via line 10 through which a part of the acid is returned directly to reactor 5. A part of the acid stream in line 10 is passed through line 11 into vessel 12 where it is heated to decompose phosphoric acid esters contained in the acid. Volatile hydrocarbons formed in vessel 12 during decomposition of the esters pass through line 13 into line 14. Phosphoric acid substantially free of esters passes from vessel 12 into line 15 and is pumped by pump 16 through heat exchanger 17, where it is cooled, into line 18 and passes via line 10 into reactor 5. A hydrocarbon layer is withdrawn from settler 9 via line 14 and passes through one of the parallel neutralizers 18 which are packed with an alkaline solid such as limestone. The neutralized hydrocarbon is withdrawn from neutralizer 18 through line 19 as the product. The neutralized hydrocarbon may be utilized directly as a motor fuel or it may be distilled to recover a particular cut and the undesired fractions may be recycled to the reactor or blended with other hydrocarbons to prepare motor fuel.

Reactor 5, settler 9 and the connecting lines are constructed from or lined with an acid-resistant metal or alloy. The rate at which the acid-resistant material corrodes should be kept as low as possible and if the rate can be kept below about 0.003 inch per 1000 hours of operation the problem of corrosion is overcome for practical purposes.

It has been found that reduction of the phosphoric acid ester content of the reaction mixture in reactor 5 and of the acid in settler 9 and the lines connecting these vessels reduces corrosion rates.

Figures 2 and 3 graphically illustrate the relation of phosphoric acid ester content to corrosion rate. In Figure 2 the corrosion rate of silver is plotted against the ester content of the reaction mixture. The data represented were obtained with phosphoric acid which had an initial concentration of 103% calculated as orthophosphoric acid and at an operating temperature of 300° F. The feed was a mixture of normally gaseous hydrocarbons containing 28–45% propylene as the olefin to be polymerized. In each run the titratable acidity of the catalyst expressed in per cent orthophosphoric acid gradually decreased as esters formed and an equilibrium condition of titratable acidity and ester content was reached in about four hours operation after which the run was continued for a long period without change of conditions in order to observe the rate of corrosion. The ratio of ester content to free phosphoric acid content in a reaction mixture where propylene is the olefin polymerized is given approximately by the following expression in which the acidities are expressed as per cent orthophosphoric acid:

$$\frac{\text{Mols esters}}{\text{Mols free } H_3PO_4} = \frac{9800 \,(\text{initial acidity} - \text{final acidity})}{42 \,(\text{final acidity})(\text{initial acidity}) - 9800 \,(\text{initial acidity} - \text{final acidity})}$$

Mol ratios so obtained have been plotted against corresponding observed corrosion rates in Figure 2. It is seen that the corrosion rate increases abruptly when the ester content rises appreciably above about 0.08 mol of esters per mol of acid and becomes prohibitive before the ester content reaches 0.10 mol of esters per mol of acid.

In Figure 3 corrosion rate of "Hastalloy B," a commercially available alloy consisting of 0.02–0.12% carbon, 62.5–66.5% nickel, 26–30% molybdenum and 4–6% iron, is plotted against the mol ratio of esters to free phosphoric acid in the reaction mixture. The data were obtained at 300° F. The initial acid concentration, pressure and feed were the same as in the runs summarized in Figure 2. From the graph it may be seen that corrosion of this alloy rapidly increases as the ester concentration rises above about 0.10 mol of esters per mol of acid in the catalyst.

High chrome-nickel austenitic alloys containing at least 16% and up to 30% chromium, containing at least 7% and up to 20% nickel, containing at least ½% of molybdenum and containing not in excess of $\frac{1}{10}$% carbon, show similar increases in corrosion as ester concentration increases; for example, "Type 317" alloy, consisting of 18–20% chromium, 10–14% nickel, not above 0.1% carbon, 3–4% molybdenum, and the remainder iron. An olefinic feed was dried in the usual manner so as to be in equilibrium with the acid in respect to water content at the reaction conditions and was contacted with liquid phosphoric acid having an initial concentration of 103% calculated as orthophosphoric acid at 300° F. and at 350 p. s. i. g. During a run with the ester content of the reaction mixture at 0.027 mol per mol of acid, the corrosion rate was 0.003 in./1000 hours. In another run with ester content at 0.086 mol per mol of acid, the corrosion rate was 0.005 in./1000 hrs.

A similar relation of corrosion rate to ester content was found with metallic copper. Runs were made with a propylene feed. When the ester content in the reaction mixture was 0.15 mol per mol of acid, the corrosion rate was 0.008 in./1000 hrs. and when the ester content was 0.51 mol per mol of acid, the corrosion rate was 0.06 in. per 1000 hours.

From these data it appears that corrosion rates of acid-resistant metallic materials may be substantially reduced by maintaining a low ester content in the phosphoric acid catalyst during the polymerization process and that reduction of the ester content of the reaction mixture to below about 0.08 mol of ester per mol of acid will reduce the corrosion rates to values which are readily tolerable in commercial practice.

Reduction of the ester content of the phosphoric acid may be effected by continuously withdrawing the acid catalyst from catalyst return line 10 of Figure 1, heating the withdrawn acid to about 500° F., at which temperature a substantial decomposition of the esters occurs, cooling the acid to reaction temperature and returning it to reactor 5 in the manner illustrated. The apparatus illustrated may be modified to permit heating at atmospheric or lower pressure in order to facilitate decomposition of the esters.

Ester concentration may also be controlled by reducing the olefin feed rate or raising the reaction temperature. As indicated above, in a liquid phosphoric acid catalyzed polymerization olefins are contacted with the catalyst at space rates above 0.5 volume olefin per volume of catalyst per hour on a liquid volume basis during the process. Ordinarily, the feed rate is within the range 0.5–20.0 v./v./hr. on a liquid volume basis. It has been found that ester concentration in the catalyst increases with space velocity and that ester content may be controlled by varying the space velocity. When equilibrium has been established in the polymerization process and it is found that ester content is above the preferred maximum of 0.08 mol per mol of acid, space velocity may be reduced sufficiently within the usual range to bring the ester concentration below this maximum.

It has been found that ester content varies with temperature, decreasing as temperature is raised. Where the equilibrium ester concentration is above 0.08 mol per mol of acid, the temperature can be raised within the 150–450° F. range to decrease the ester concentration to below 0.08 mol per mol of acid.

The desired reduction in ester content of the reaction mixture may be obtained by simultaneously increasing temperature and decreasing space velocity within the above limits.

It should be recognized that variation of space velocity and temperature may effect product quality and that it may in some instances be undesirable to vary these process conditions appreciably. In such cases ester concentration will be most desirably controlled by continuous withdrawal of a portion of the catalyst for ester decomposition.

We claim:

1. In a polymerization process wherein normally gaseous olefins are contacted with concentrated liquid phosphoric acid in a polymerization zone presenting acid-resistant metallic surfaces to the reaction mixture and wherein phosphoric acid esters of said olefins are formed during the process, the method of decreasing corrosion of said metallic surfaces which comprises maintaining the concentration of said esters in the reaction mixture below about 0.08 mol of ester per mol of free phosphoric acid.

2. In a polymerization process wherein normally gaseous olefins are intimately mixed with liquid phosphoric acid in a polymerization zone at a temperature in the range about 150–450° F. and at a space velocity between about 0.5 and 20 volumes of liquid olefin per volume of acid per hour to produce a reaction mixture comprising normally gaseous olefins, polymers of normally gaseous olefins, esters of phosphoric acid, and phosphoric acid, said polymerization zone presenting acid-resistant metallic surfaces to the reaction mixture, the method of decreasing corrosion of said metallic surfaces which comprises maintaining the concentration of said esters in the reaction mixture below about 0.08 mol of ester per mol of free phosphoric acid.

3. The method as defined in claim 2 wherein the ester concentration is maintained below 0.08 mol of ester per mol of acid by continuously withdrawing reaction mixture from the reaction zone, settling the withdrawn mixture to separate an acid phase comprising phosphoric acid and esters of phosphoric acid, heating the separated acid phase to decompose said esters and returning the acid phase to the polymerization zone.

4. In a polymerization process wherein normally gaseous olefins are intimately mixed with concentrated phosphoric acid in a polymerization zone having acid-resistant metallic surfaces at a temperature in the range of about 150–450° F. and wherein esters of phosphoric acid are formed during the process, the method of reducing corrosion of said metallic surfaces which comprises selecting and maintaining a low space velocity in the range of 0.5 to 20 volumes of liquid olefins per volume of acid per hour such that the concentration of said esters in the polymerization zone does not exceed 0.08 mol of ester per mol of free acid.

5. A process for the polymerization of normally gaseous olefins to normally liquid hydrocarbons which comprises intimately mixing said olefins with concentrated liquid phosphoric acid in a polymerization zone, presenting acid-resistant metallic surfaces to the acid and hydrocarbons, passing a mixture of acid and hydrocarbons from the polymerization zone to a settling zone, separating an acid phase and a hydrocarbon phase in the settling zone, withdrawing the acid phase from the settling zone and returning it to the polymerization zone and heating a portion of the withdrawn acid phase to decompose associated phosphoric acid esters before returning it to the polymerization zone to maintain an ester concentration in the polymerization zone not exceeding 0.08 mol of ester per mol of free acid.

6. The process as defined in claim 5 wherein at least a portion of the acid withdrawn from the settling zone is heated to a temperature above that of the polymerization zone and above 400° F. before returning it to the polymerization zone.

7. A process for the polymerization of normally gaseous olefins to normally liquid hydrocarbons which comprises intimately mixing said olefins with concentrated liquid phosphoric acid in a polymerization zone, presenting acid-resistant metallic surfaces to the acid and hydrocarbons, passing a mixture of acid and hydrocarbons from the polymerization zone to a settling zone, separating an acid phase and a hydrocarbon phase in the settling zone, withdrawing the acid phase from the settling zone and returning it to the polymerization zone, heating a portion of the withdrawn acid phase to a temperature in the range 400–500° F. before returning it to the polymerization zone to maintain an acid concentration in the polymerization zone not exceeding 0.08 mol of ester per mol of free acid.

8. The method as defined in claim 1 wherein the acid-resistant metallic surfaces are copper.

9. The method as defined in claim 1 wherein the acid-resistant metallic surfaces are composed of an alloy consisting essentially of 0.02–0.12% carbon, 62.5–66.5% nickel, 26–30% molybdenum and 4–6% iron.

10. The method as defined in claim 1 wherein the acid-resistant metallic surfaces are composed of an alloy consisting essentially of 18–20% chromium, 1–14% nickel, 3–4% molybdenum, up to 0.1% carbon and the remainder iron.

11. The method as defined in claim 1 wherein the acid-resistant metallic surfaces are composed of austenitic alloys containing 16% to 30% chromium, 7% to 20% nickel, ½% to 8% molybdenum, not above 0.1% carbon, and the remainder iron.

JACOB D. KEMP.
LLOYD F. BROOKE.

REFERENCES CITED

The following references are of record in the file of this patent:

Ipatieff, "Catalytic Polymerization of Gaseous Olefins by Liquid Phosphoric Acid," Indus. and Eng. Chem., vol. 27, No. 9, September, 1935, pages 1067 to 1069.